US008774394B2

(12) United States Patent
Bienfait et al.

(10) Patent No.: US 8,774,394 B2
(45) Date of Patent: Jul. 8, 2014

(54) SYSTEM AND METHOD FOR ELIMINATING HOLD TIME IN A TELECOMMUNICATIONS NETWORK

(75) Inventors: Roberta Bienfait, Norcross, GA (US); Richard V. Cox, New Providence, NJ (US); Behzad Nadji, Los Gatos, CA (US); Bernard S. Renger, New Providence, NJ (US); Behzad Shahraray, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1819 days.

(21) Appl. No.: 11/315,630

(22) Filed: Dec. 23, 2005

(65) Prior Publication Data
US 2006/0245579 A1 Nov. 2, 2006

Related U.S. Application Data

(60) Provisional application No. 60/675,184, filed on Apr. 27, 2005.

(51) Int. Cl.
*H04M 3/00* (2006.01)
(52) U.S. Cl.
USPC .................................. 379/266.01; 379/265.09
(58) Field of Classification Search
USPC ............. 379/265.02, 221.08, 265.01, 265.09, 379/266.01
See application file for complete search history.

(56) References Cited

U.S. PATENT DOCUMENTS 6,668,286 B2 * 12/2003 Bateman et al. .................. 710/6
2004/0054743 A1    3/2004 McPartlan et al.
2009/0161858 A1 *  6/2009 Goss et al. ............... 379/265.09

OTHER PUBLICATIONS

U.S. Appl. No. 11/315,590 to Roberta Bienfait et al., filed Dec. 23, 2005.
Canadian Office Action dated Jan. 28, 2010 that issued with respect to patent family member Canadian Patent Application No. 2,544,804.

* cited by examiner

*Primary Examiner* — Rasha Al Aubaidi
(74) *Attorney, Agent, or Firm* — Greenblum & Bernstein, P.L.C.

(57) ABSTRACT

A method and system for managing requests in a hold queue and the responses thereto are described. By providing a management system for handling requests in a call queue, a requesting party may be free to perform other tasks while waiting for a response. In addition, the management system may modify request priority independently of a party receiving the request. The method and system may further facilitate the entry of request related information by implementing an information database. The flexibility of a receiving party in responding to a request may also be enhanced through a greater selection of response options. The management system and method may further provide automatic backup and secondary options if a receiving party's first option is unfeasible.

7 Claims, 12 Drawing Sheets

WorkList

New Ticket

| Agent | BMP Ticket # | LEC Ticket # | ID Number | AT&T Message | LEC Message | Start Time | Elapsed Time | Progress | Status |
|---|---|---|---|---|---|---|---|---|---|
| demo | 111111111 | z111 | 1129556377 | Audio | None | 10/17/2005 09:39:37 | 00:01:00 | Inactive | LEC agent connected with AT&T agent |
| demo | 222222222 | z222 | 1129648138 | Audio | None | 10/18/2005 11:08:58 | 00:01:22 | Inactive | LEC agent connected with AT&T agent |
| demo | 333333333 | z333 | 1129580194 | Audio | None | 10/17/2005 16:16:34 | 00:01:18 | Inactive | LEC agent connected with AT&T agent |
| demo | 444444444 | z444 | 1129582921 | Text | None | 10/17/2005 17:08:16 | 00:00:46 | Inactive | LEC agent connected with AT&T agent |
| demo | 555555555 | z555 | 1129583163 | Text | None | 10/18/2005 17:06:03 | 00:01:46 | Inactive | LEC agent connected with AT&T agent |
| demo | 666666666 | z666 | 1129653994 | Audio | None | 10/18/2005 12:46:34 | 00:02:18 | Inactive | LEC agent connected with AT&T agent |
| demo | 777777777 | z777 | 1129584642 | Text | None | 10/17/2005 17:30:42 | 00:01:04 | Inactive | LEC agent connected with AT&T agent |

Refresh Page
Help
Logout

FIG. 7B

| BMP Ticket # | LEC Ticket # | ID Number | LEC Phone # | AT&T Phone # | Start Time | Elapsed Time | Retry | Status |
|---|---|---|---|---|---|---|---|---|
| 444444444 | z444 | 1129582921 | 9733608027 | 9733608156 | 10/17/2005 17:02:01 | 00:00:07 | No | LEC agent answered the call |
| 444444444 | z444 | 1129582921 | 9733608027 | 9733608156 | 10/17/2005 17:02:01 | 00:00:22 | No | LEC agent hung up |
| 555555555 | z555 | 1129583163 | 9733608027 | 9733608156 | 10/17/2005 17:02:01 | 00:00:07 | No | LEC agent answered the call |
| 555555555 | z555 | 1129583163 | 9733608027 | 9733608156 | 10/17/2005 17:06:03 | 00:00:22 | No | LEC agent pressed pause |
| 555555555 | z555 | 1129583163 | 9733608027 | 9733608156 | 10/17/2005 17:06:03 | 00:00:56 | No | LEC agent pressed replay |
| 555555555 | z555 | 1129583163 | 9733608027 | 9733608156 | 10/17/2005 17:06:03 | 00:01:05 | No | LEC agent pressed one |
| 555555555 | z555 | 1129583163 | 9733608027 | 9733608156 | 10/17/2005 17:06:03 | 00:01:41 | No | LEC agent connected with AT&T agent |
| 555555555 | z555 | 1129583163 | 9733608027 | 9733608156 | 10/17/2005 17:06:03 | 00:01:42 | No | LEC agent connected with AT&T agent |
| 555555555 | z555 | 1129583163 | 9733608027 | 9733608156 | 10/17/2005 17:06:03 | 00:01:46 | No | AT&T agent hung up |

FIG. 7C

SYSTEM AND METHOD FOR ELIMINATING HOLD TIME IN A TELECOMMUNICATIONS NETWORK

This application claims priority to provisional U.S. application Ser. No. 60/675,184, filed Apr. 27, 2005, having the title "SYSTEM AND METHOD FOR ELIMINATING HOLD TIME," herein incorporated by reference in its entirety for all purposes.

FIELD OF THE INVENTION

The invention relates generally to a method and a system of eliminating hold time in a telecommunication system. Specifically, the invention relates to managing calls in a hold queue and responses from a receiving party.

BACKGROUND OF THE INVENTION

With the growing capabilities of communication systems and technologies, companies and organizations have increasingly gravitated toward providing customer service through telecommunications and calling centers. Many businesses and organizations implementing such systems, however, are inundated with calls on a regular basis from customers who need immediate attention or prefer communicating via telephone. For example, many on-line retailers provide a customer service hotline for order status inquiries or complaints. Depending on the popularity of the retailer, such a customer service hotline may receive hundred or thousands of calls a day. Alternatively, a business may experience a high number of service requests due to a particular event. In one example, inclement weather may cause a widespread power outage and generate a significant volume of calls to the power company from customers affected by the outage. Thus, to handle such high volumes of calls, many businesses and organizations have resorted to implementing a call holding system whereby incoming calls are placed in a queue until a live agent is available to handle the call. Consequently, those calling a customer service center may be required to wait in a queue for minutes or hours before a live agent is available to address their concerns.

During the hold time, callers must generally stay in close proximity to their telephones in order to know when an agent has picked up their call. A caller is thus limited in their activities until the call is fielded and their concerns are resolved. Even with the mobility of cellular telephones, a caller must still stay within a particular vicinity of the phone in order to detect that a live agent has come on the line. Additionally, hold time for a mobile telephone may translate to significant costs as many cellular networks charge mobile phone usage by the minute.

Furthermore, even when a live agent is available to handle a call, the agent may not be able to resolve the particular issue due to a variety of reasons, including a lack of expertise, lack of information and length of processing time. Agents are also often restricted to just a callback option when fielding a request or call. As such, a requesting party may experience further delays or inconvenience if the receiving agent is unable to handle the request. Thus, a lack of information and flexibility in handling queued requests on the part of the receiving party (i.e., an agent receiving the service requests) may result in significant inefficiencies.

For the foregoing reasons, a method and system for managing calls in a hold queue and responses from a receiving party is needed.

BRIEF SUMMARY OF THE INVENTION

Aspects of the invention are pertinent to a method and system of facilitating a user's request for service in a telecommunication system and responses thereto.

In one aspect, a party requesting service may initiate a call to an organization and reserve a spot in the call queue without physically waiting on the connection. Such a method and system would allow a party requesting service or information to perform other tasks or activities until a live agent is available to address their needs. Once a live agent becomes available, the requesting party would be called and a communication link between the agent and the requesting party would be established. If, however, an agent removes the call from the queue without resolving the issues or requests, a requesting party may enable a retry option to automatically re-queue the call. Additionally, an interface may be implemented through which a requesting party may enter their information and information pertinent to the request prior to initiating the call. The inputted information could then be automatically transferred to a live agent upon fielding the call. This would further reduce any unnecessary communication time and resources and further increase the efficiency of resolving service or information requests.

In another aspect, an agent fielding a request may preview the request or other information prior to engaging in communications with the requesting party. Upon hearing or reviewing the provided request information, an agent may select a variety of options relating to request handling. Such options may include callback, record reply message, transfer and pause. For example, if an agent, upon hearing the requesting party's request and determining that the request was placed with the incorrect department, may transfer the call to the correct department and call queue. Alternatively, if the agent is able to independently resolve the request without speaking to the requesting party, the agent may record a reply message. The requesting party will then be contacted with the recorded message.

In yet another aspect, a requesting party may initially request service or information through e-mail or by generating a service request ticket. A requesting party may be able generate a local ticket containing information related to the problem or issue and/or contact information that is transmitted to a receiving party. Thus, instead of placing a call in a queue, a corresponding ticket on the receiving party's end may be placed in a queue. In both cases, the call or ticket may further contain a parameter indicative of a level of urgency. In response to the level of urgency exceeding a predefined threshold, a system may extract data from the ticket to automatically initiate a call to a predefined number or address and place the ticket-call in a call queue. The number or address may correspond to an emergency help center or an agent that handles only high urgency problems. In the case of a pre-existing call, the call may be automatically transferred to the queue of the predefined telephone number or network address.

In yet another aspect, the various calls or tickets in a particular queue may further have a parameter indicative of importance or priority. Generally, a call management system arranges calls and tickets according to the order received. However, a requesting party or a request management system may, instead, automatically rearrange the order of the requests according to the priority.

In another aspect, a receiving party that selects a callback option may be redirected to a secondary option in response to a determination that the requesting party is currently unavailable. The receiving party may, for example, be prompted to record an audio message to be transmitted to the receiving party. The secondary option may be predefined by default or user preferences.

These as well as other advantages and aspects of the invention are apparent and understood from the following detailed description of the invention, the attached claims, and the accompanying drawings.

BRIEF DESCRIPTION OF THE DRAWINGS

The invention is illustrated by way of example and not limited in the accompanying figures in which like reference numerals indicate similar elements and in which:

FIGS. 7A, 7B & 7C illustrate various status pages showing information related to current outstanding calls or requests.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
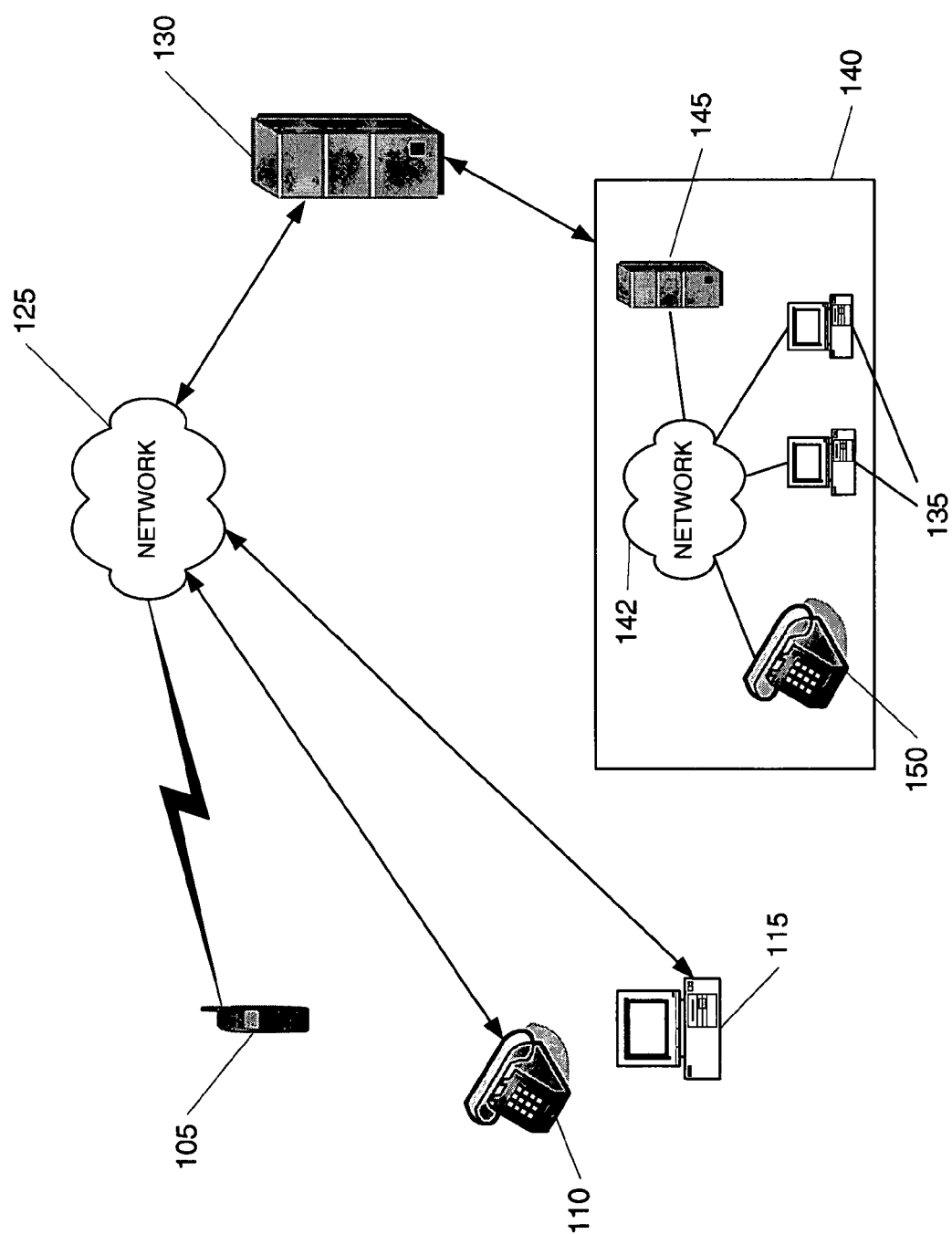
FIG. 1 is a block diagram of an operating environment in which one or more embodiments may be implemented.

FIG. 1 illustrates a block diagram of an operating environment in which one or more embodiments may be implemented. A party requesting service or information from a receiving party such as a company or organization may use a variety of devices to communicate the request. Such communication devices include, but are not limited to, a mobile telephone 105, a land-line telephone 110, a personal computer (PC) 115 and the like. Communication devices are generally connected to a communication network 125 to facilitate data and communication transfers between devices on the same or different networks. Various types of communication networks 125 include cellular networks, land-based telephone networks and computer networks. Computer networks may further include either wireless area networks (WAN) or local area networks (LAN) or a combination of both. The different types of communication networks 125 may also use differing communication protocols. For example, cellular networks may abide by standards such as GSM or CDMA, whereas wireless computer networks may implement BLUETOOTH protocols. In another example, a communication network may implement VoIP communications, allowing a user of PC 115 to use a softphone application to conduct telecommunications. Additionally, a communication system may further implement methods for converting transmissions sent using a particular protocol into transmissions compatible with another protocol. As such, a single communication network 125 may be able to facilitate communications from sources using multiple protocols.

Using the various communication devices described above, a party may communicate their request through an interface implemented on a third-party server 130. The third-party server 130 may act as a communication conduit and facilitator between the requesting party and the receiving party (i.e., party that receives and processes the request). Server 130 may include numerous types of servers such as web servers, application servers, audio/video servers, telnet servers and/or combinations thereof. In one example, server 130 may include a web server for providing a web interface with which a requesting party may enter information related to their request and initiate a call to the receiving party. In another example, server 130 may be an application server that provides an application-based interface to the requesting party for initiating and facilitating communications with the receiving party. The server 130 may further include a Voice Extensible Markup Language (VoiceXML) server (not shown) capable of translating Internet data into voice and audio signals and vice versa. A VoiceXML gateway permits a receiving party with a telephone using Plain Old Telephone Service (POTS) to receive requests embedded with or including Internet data. As such, data submitted by a requesting party using a web browser interface may be converted into voice and audio output compatible with ordinary telephone networks. One of skill in the art will appreciate that there are many forms of data that may be translated into telephone network-compatible audio. For example, an image input by a requesting party may be translated into the name of the image or a description of the image. In one alternative embodiment, the VoiceXML server may be hosted on a system separate and distinct from the interface server 130.

In instances where the communication devices of the receiving parties are Voice over Internet Protocol (VoIP) enabled, the VoiceXML gateway may facilitate the communication of Internet data. In one example, a customer service center 140 may field calls using personal computers 135 with one or more peripherals (i.e., microphone and earphones/speakers). The personal computers 135 may also implement a softphone application that can parse an Internet data stream and display a variety of transmitted information. Thus, when a server 130 transmits communication data relating to a requesting party's personal information, this information may be viewed or displayed through the softphone application. The VoiceXML gateway may process the communication data to insure compatibility with the receiving party's VoIP system.

A customer service center 140 connected to the communication network 125 may include a local network 142, a network server 145 and one or more networked communication devices such as PCs 135 & telephone 150. The network server 145 may serve as a hub for all incoming communications, including requests for service. The server 145 may further implement a queuing system (not shown) whereby communication requests received in excess of live agent availability are placed in a queue in the order that they were received. The queuing system may order or sort calls or requests using a variety of methodologies including a priority system. Additionally, the internal network 142 enables the network server 145 to distribute requests and associated information to one or more specified terminals 135 & 150 when the agent at a terminal becomes available. Each terminal 135 & 150 may further include one or more input devices such as a computer mouse, keyboard, microphone and/or touchpad. Numerous human input devices are known in the art and may also be included according to the specific needs of a servicing agent. Various input devices may be used to accomplish differing tasks including data entry, communications, communications management and research.

The communication entities described in FIG. 1 may use and implement a variety of telecommunication devices, networks and technologies and are not limited to VoIP systems. For example, a requesting party may use a telephone operating through POTS to submit a service request.

Figure 2:
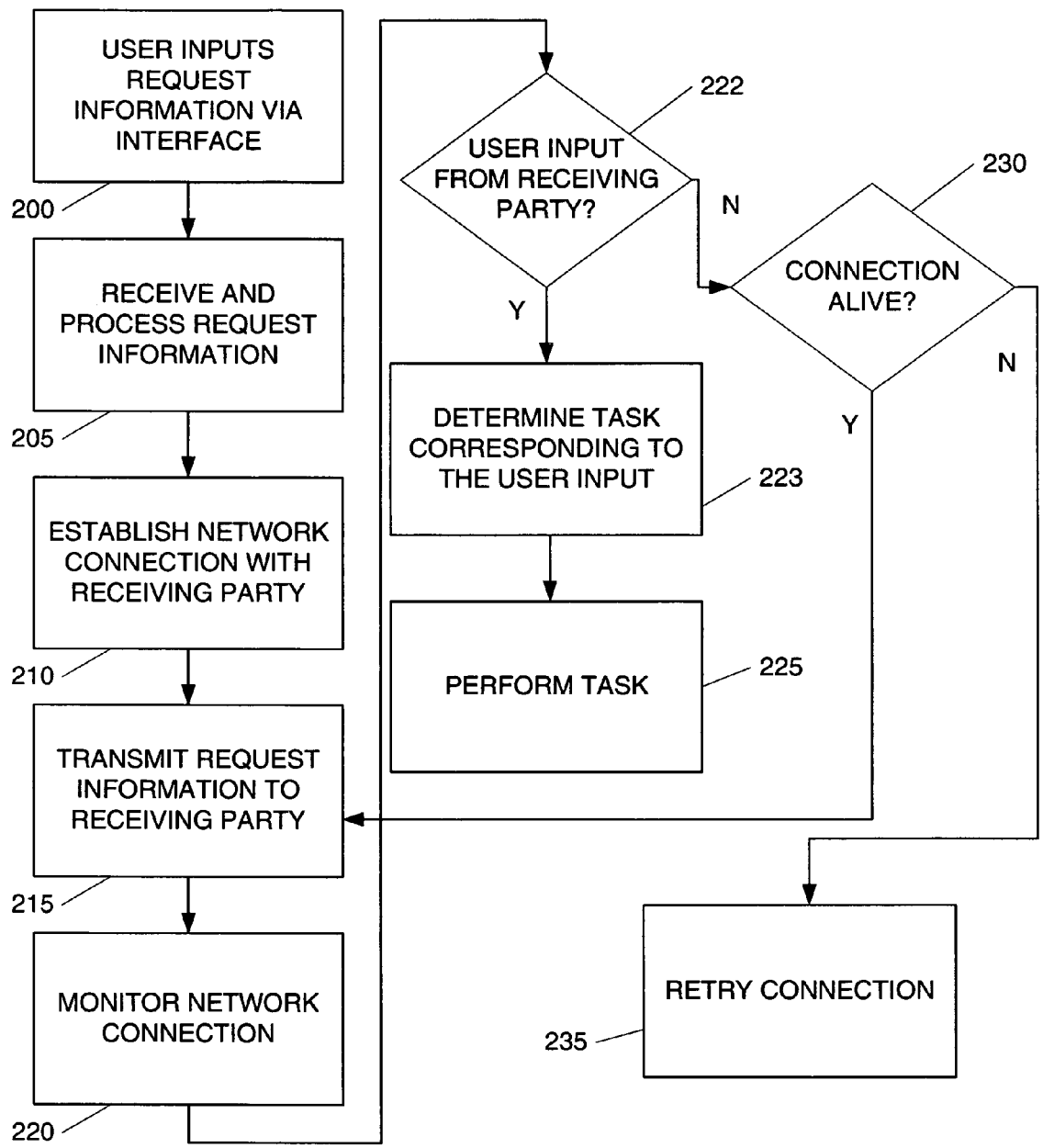
FIG. 2 is a flowchart showing a method of managing and minimizing hold time for a requesting party according to an illustrative embodiment.

FIG. 2 illustrates one method of managing and minimizing hold time for a requesting party. In step 200, a requesting party inputs information into an interface (e.g., web, graphical user interface) relating to their request for service. Such information may include a text description of the problem or question (to be played using text-to-speech to the receiving party), a callback number or network address, a destination number of the receiving party, a customer identification number and the like. In an alternative embodiment, the requesting party may also record an audio message to be played to the receiving party. This audio message can be recorded by selecting an option on the graphical user interface (GUI) to dial the callback number. Alternatively, if a softphone client is used by the requesting party, a different selection on the graphical user interface could cause the softphone client to be called. The information relating to the request is then received by the communication server (e.g., server 130 in FIG. 1) in step 205. In some instances, the communication server may process the received data and extract the pertinent information prior to transmitting the call to the receiving party. For example, a customer calling a retailer to request a shipping estimate may enter the retailer's phone number, an order number and a callback number. By providing a callback number, a requesting party is relieved from having to continuously monitor a connection with the receiving party to determine when a live agent becomes available. Instead, the requesting party may be called back when an agent is available.

After the communication server determines a number or address of the receiving party, the communication server may subsequently establish a network connection with the receiving party in step 210. One method of establishing the network connection is through a VoiceXML gateway. The communication server operating may include a servlet that acts as an application interface between the communication server and the VoiceXML gateway. The servlet, upon receiving a communication request (i.e., service request) from the requesting party, opens a telnet session to the VoiceXML gateway and passes relevant information to the gateway. This information may include the receiving party's phone number or address, a callback number of the requesting party as well as any request specific data that needs to be relayed to the receiving party. Other information for establishing a network connection may include a series of digits (i.e., touch-tones associated with the digits) corresponding to telephonic voice menu options. In one example, if a requesting party knows of a particular sequence of menu options to reach the desired department, the sequence may be provided to the VoiceXML gateway. Once the information transfer is confirmed, the servlet may then issue a call command which would initiate an outbound call via the VoiceXML gateway to a communication device or system of the receiving party. Nevertheless, other methods for establishing a network connection may be implemented.

After the communication connection has been established between the VoiceXML gateway and the receiving party's communication system, the request-related information is relayed to the receiving party in step 215. For example, the VoiceXML gateway may transmit the requesting party's order number, the requesting party's name and the subject of the call. Alternatively, this information may be relayed by playing a previously recorded audio file to the receiving party. This information may also be played to the receiving party via text-to-speech from previously entered or stored text. The VoiceXML gateway may also provide a menu of response options from which a receiving party may choose. In some cases, even though a connection has been established, the call is merely placed in a queue until a live agent of the receiving party becomes available. As such, the VoiceXML gateway may repeat the transmission of the relevant information while monitoring the connection for user input from the receiving party. The repetition of the transmission of the relevant information insures that a receiving party, upon fielding the call, will have an opportunity to hear the transmitted information and the menu of options. In step 220, the VoiceXML gateway monitors the connection with the receiving party to detect user input from the receiving party. In response to detecting user input in step 222, the VoiceXML gateway evaluates the detected input to determine the task corresponding to the user input in step 223. The determination may be made using a variety of methods. For example, the VoiceXML gateway may be able to discern the touch-tone frequencies corresponding to the numbers associated with the different tasks. In another example, the VoiceXML gateway may have speech recognition capabilities allowing a receiving party to speak her choice rather than enter a touch-tone. Once the selected task has been determined, the VoiceXML gateway then performs the various functions associated with the task in step 225. In one instance, the option corresponding to the '1' button allows a receiving party to invoke a callback feature. Thus, if the VoiceXML gateway determines that a receiving party has pressed '1,' the VoiceXML gateway would establish a second connection with the requesting party and subsequently link the two connections. Various tasks and the processing of those tasks will be discussed in detail below.

While waiting for user input from the receiving party, the VoiceXML gateway may periodically evaluate the status of the connection to determine whether the connection is still alive, as illustrated in step 230. If the connection is still alive, the VoiceXML gateway may continue to transmit the relevant request information as described in step 215. However, if the connection has been disrupted or severed, the VoiceXML gateway may re-establish the connection with the receiving party in accordance with a predefined retry interval in steps 235 and 210. This failure logic would instruct the VoiceXML gateway to retry a call under various predefined conditions. Such conditions may include unintentional disconnections and/or the reception of an unsatisfactory response. The retry period may be set according to a default value, user preferences or a receiving party's regulations. Additionally, the number of retries may be limited by the requesting party, the receiving party or the VoiceXML gateway.

Figure 3A:
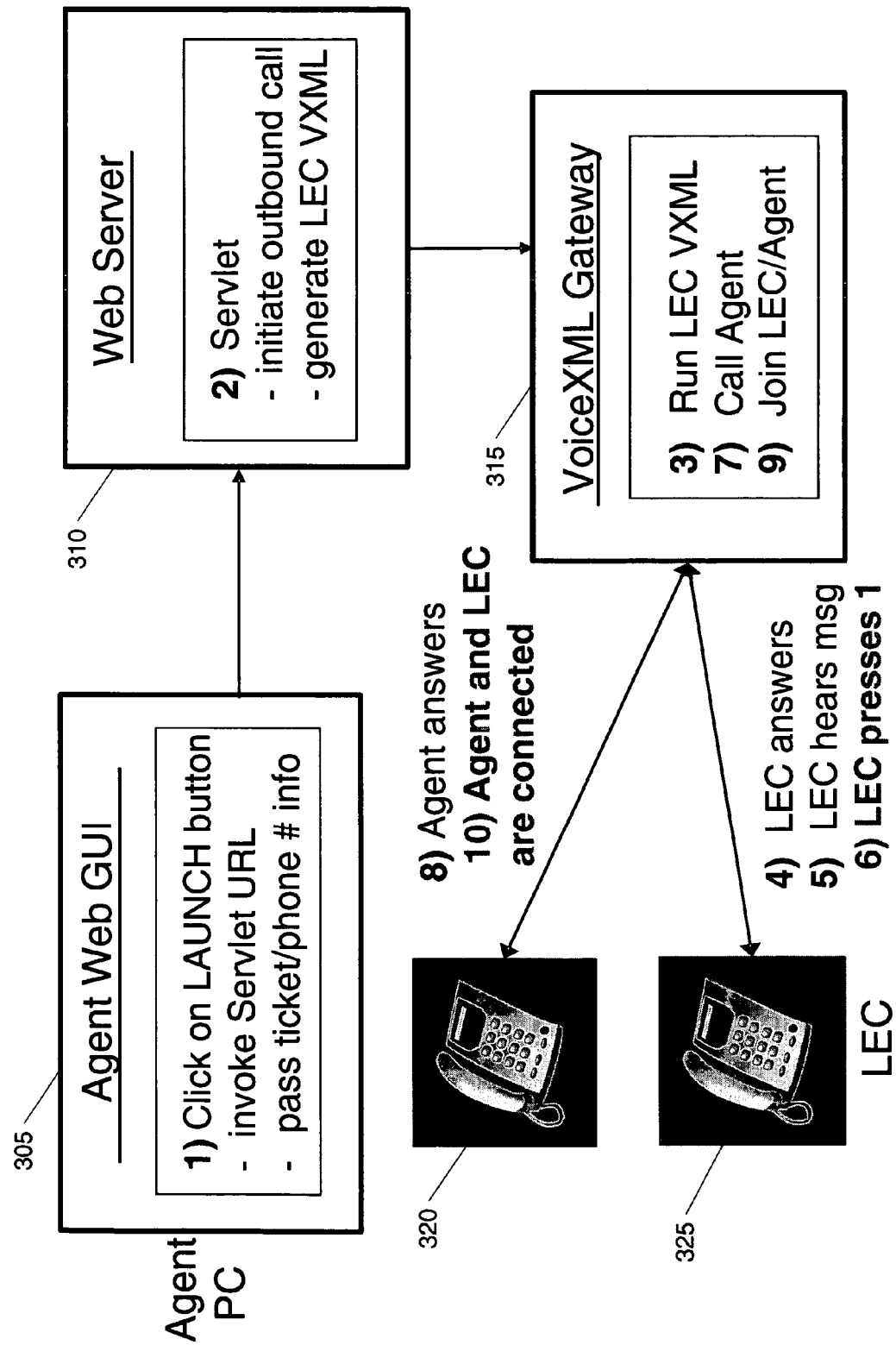
FIGS. 3A & 3B are block diagrams illustrating the processing and performance of two tasks according to an illustrative embodiment.
Figure 3B:
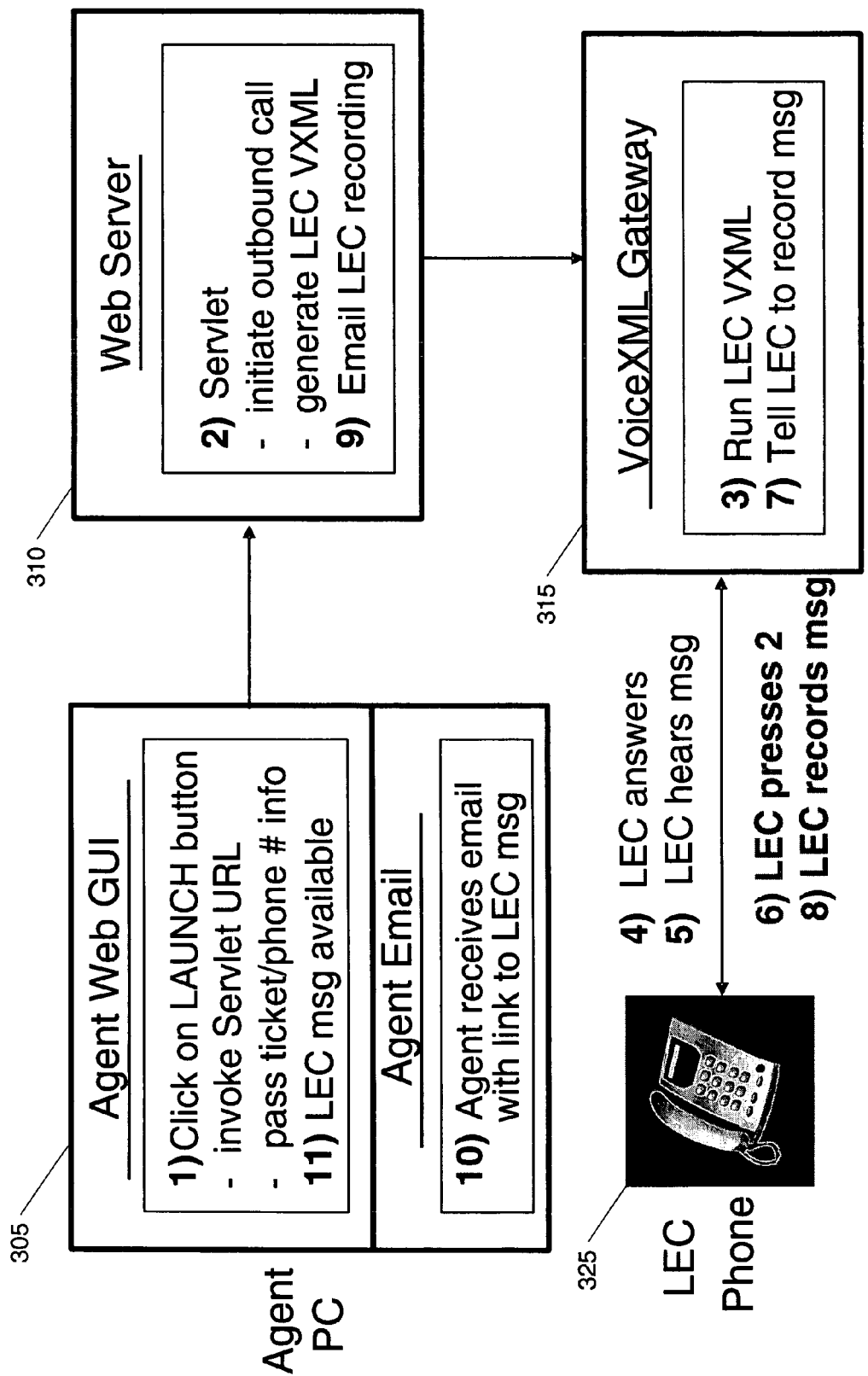

FIGS. 3A & 3B are block diagrams illustrating the processing and performance of two tasks. Referring to FIGS. 3A & 3B, a long distance telephone service provider (320 in FIG. 3A; e.g., AT&T Corp.) is shown requesting service from a local exchange carrier (LEC) 325. The long distance provider 320 may be the requesting party, while the LEC 320 would be acting as the receiving party. Initially, the long distance service provider 320, or an agent thereof, as the requesting party, would enter information related to the service request into a Web GUI via the requesting party's computer 305. The long distance provider 320 may then request that a call be launched to the LEC 325, or receiving party. The servlet of the Web Server 310 would initiate the outbound call by issuing a command to the VoiceXML gateway 315 as described previously. Such an instruction may also contain LEC contact information (e.g., a phone number or a network address) and callback information for the long distance provider 320 (e.g., phone number or a network address). Upon connecting to the LEC, the VoiceXML gateway 315 may subsequently transmit the information relating to the requesting party's service request along with a menu of response options to the LEC 325.

Referring to FIG. 3A, the touch-tone associated with the number '1' in a telephone system has a predefined correspondence with the callback feature. Thus, in a VoIP system using a softphone, the receiving party may select the image of the '1' button on the screen to select the callback feature. Once a live agent at the LEC 325 answers the call and hears the information including the one or more response options, she may decide to press '1.' The VoiceXML gateway 315 would detect the user input and determine that the LEC 325 wishes to call the long distance provider agent 320. A second connection between the VoiceXML gateway 315 and the requesting party 320 may then be established by the gateway 315. The second connection may be established using a method substantially similar to that used to establish the connection between the gateway 315 and the LEC 325. The two connections are subsequently linked to allow the LEC agent 325 and the long distance provider agent 320 to communicate and discuss the service request. After picking up the connection but before being connected to the LEC agent 325, the VoiceXML gateway 315 may also play any relevant information about the reason for the call (or customer/service/order number) and could prompt the long distance provider agent 320 to enter a specific touch-tone to indicate her presence. This could be used to ensure that the connection did not lead to a voicemail system.

In addition, the callback option may initiate network connections to multiple destinations. For example, if a requesting party 320 may specify multiple parties that should be contacted in regard to a particular request. Thus, when a receiving party 325 selects the callback option, the VoiceXML gateway 315 may initiate multiple simultaneous connections to each of the designated parties. In another example, the VoiceXML gateway 315 may attempt to establish connections to each of the parties in succession. In other words, if one party is unavailable, the VoiceXML gateway 315 may attempt to call the next party specified in the list.

FIG. 3B illustrates a method similar to the one shown in FIG. 3A for processing a request from a requesting party and establishing a connection with the LEC through a VoiceXML gateway. However, in FIG. 3B, the LEC agent 325, upon fielding the call and hearing the request information, may decide to record and transmit a message rather than conduct live communications with the requesting party. Here, the touch-tone associated with the number '2' in a telephone system may have a predefined correspondence with the recording feature. For example, a requesting party may have submitted a service request relating to a telephone outage. While the request is in the queue, however, the receiving party (i.e., LEC) 325 is able to re-establish telephone service for the requesting party (e.g., a long distance provider such as AT&T). Thus, once the LEC 325 fields the request, the LEC agent 325 may press the '2' option and record a message stating that the issue has been resolved, rather than conducting a live discussion with the agent of the long distance provider. The recorded message may then be transmitted to the requesting party via the VoiceXML gateway 315 by establishing a second connection between the gateway and the requesting party. Alternatively, the VoiceXML gateway 315 may formulate an automated e-mail to the requesting party containing the recorded message as an attachment or containing a link to the recorded message. The e-mail may then be transmitted to the requesting party's computer 305 or computing device. The requesting party may also receive a callback with the audio playback as well as a copy of the recorded message through e-mail. Numerous other methods for transmitting audio data may also be implemented.

Numerous other response options may also be implemented including pause, instant message, replay, forced retry, and transfer. For example, a pause feature may allow a receiving party to indicate to the VoiceXML gateway and/or the requesting party that the call has been fielded, but that the receiving party requires more time to respond. In one embodiment, the VoiceXML gateway may place the request in a pause state until input is received from the receiving party. In an alternative embodiment, the receiving party may specify an amount of pause time. In response, the VoiceXML gateway may place the request on hold for the requested or default amount of pause time instead of waiting until input is received from the receiving party. Upon expiration of the pause time, the receiving party may once again be prompted to enter a response. In addition, if the receiving party missed hearing a large portion of the request information, the receiving party may select a replay option to have the information repeated. Another option that may be available is the transfer option. One method of transferring a call is by using a local transfer feature of a receiving party's phone system as known in the art. Another method of transferring the call would be for a VoiceXML gateway to provide the receiving party with a transfer option. Upon selecting the transfer option, the VoiceXML gateway may then prompt the receiving party for a new or alternative phone number. The VoiceXML gateway would then reestablish the connection with the designated phone number without requiring input from or interaction with the requesting party.

By selecting the instant message option, a receiving party may cause an instant message to be sent to the requesting party using a specified instant messaging handle. The instant message to the requesting party could contain information such as the ticket number or a link to the recorded message of the receiving party (if the recording feature was also utilized). In this case, the instant message option may be used in conjunction with the recording option. In one example, a VoiceXML gateway may prompt the receiving party to select another option after an unsuccessful attempt to call back the requesting party. The receiving party may then select the instant messaging option. The VoiceXML gateway would then prompt the receiving party to record a message and the receiving party could send the requesting party an instant message containing the message via the VoiceXML gateway. The requesting party could also receive an email containing a link to the audio recording or containing the audio file itself. In one embodiment, the VoiceXML gateway/web server would be assigned an IM handle in order to generate and send instant messages to the requesting party. Without an IM handle the VoiceXML gateway or web server may be unable to send or receive instant messages to the requesting party. The requesting party could also send an instant message back to the IM handle assigned to the VoiceXML gateway/web server (using the voice channel or other unique identifier on the VoiceXML gateway to ensure the message is being sent to the correct receiving party). The information contained in the instant message may then be played to the receiving party as text-to-speech via the VoiceXML gateway.

If the receiving party and/or the requesting party use a softphone client instead of a POTS telephone and one or both use separate, embedded, or integrated Instant Messaging clients, each party may be able to not only speak to each other using the softphone client but also transfer text or files. For example, the receiving party could pass the ticket number or the link to a recorded audio message or could pass the actual recorded audio file. Conversely, the requesting party could interact with the receiving party and focus the interaction on the text or file transfer mode of communication instead of speaking to each other. As such, the softphone clients may be used to establish the communication between the two parties but once the communication is established, the two parties may interact by any means within the capabilities of the softphone client.

The forced re-attempt or retry option, on the other hand, permits a receiving party to force the VoiceXML gateway to re-attempt the call at a later time. For example, a receiving party may receive multiple calls at the same time, some relating to emergency conditions and others relating to non-emergency situations. The receiving party may force the requests corresponding to non-emergency situations to retry their request at a later time so that more communication circuits are available to field emergency calls. The VoiceXML gateway would thus disconnect the call and retry after a specified amount of time. The retry time may be defined by a default or specified by the receiving party. The requesting party may also override any retry time specified by the receiving party or set by default.

The response options described herein may be used separately or in combination with one another. In particular, a VoiceXML gateway may allow a requesting party to select multiple response options when launching a call or recording a response. For example, the requesting party may allow an instant message to be sent to the requesting party while also initiating a callback. This would permit the receiving party to transmit files or data (e.g., a web site link, documented instructions) before or while conducting a live conversation on the telephone. Or the requesting party may allow an instant message to be sent to the requesting party after the receiving party recorded a response.

In one or more alternative embodiments, the menu of response options provided by the VoiceXML gateway to a receiving party may be customized according to the requesting party's preferences. Thus, instead of providing options to the receiving party that include callback, message recording, pause, replay, forced retry, instant message and transfer, the menu of options may only include callback and pause. In one example, an agent of a long distance provider may have several outstanding service requests from various LECs. To avoid being inundated by a flood of callbacks, the agent might not provide the callback option for those calls that are of lower priority or importance. Alternatively, if an agent has a service request that is particularly complicated, the agent may instruct the VoiceXML gateway to provide the receiving party with only a callback option. The VoiceXML gateway may receive such preferences from the requesting party via the web server and/or interface or any one of several alternative methods known in the art. For example, an agent, when initiating the service request on a web GUI, may be presented with and choose from a list of potential options.

Additionally, the VoiceXML gateway or communication server may include cancellation logic that removes a call from the receiving party's queue in response to a predefined event. In one example, a requesting party may manually cancel a service request. In another example, a receiving party may specify that all service requests of a particular category have been resolved. In response to such an indication, the VoiceXML gateway or communication server may cancel all service requests that fall under the specified category.

Figure 4:
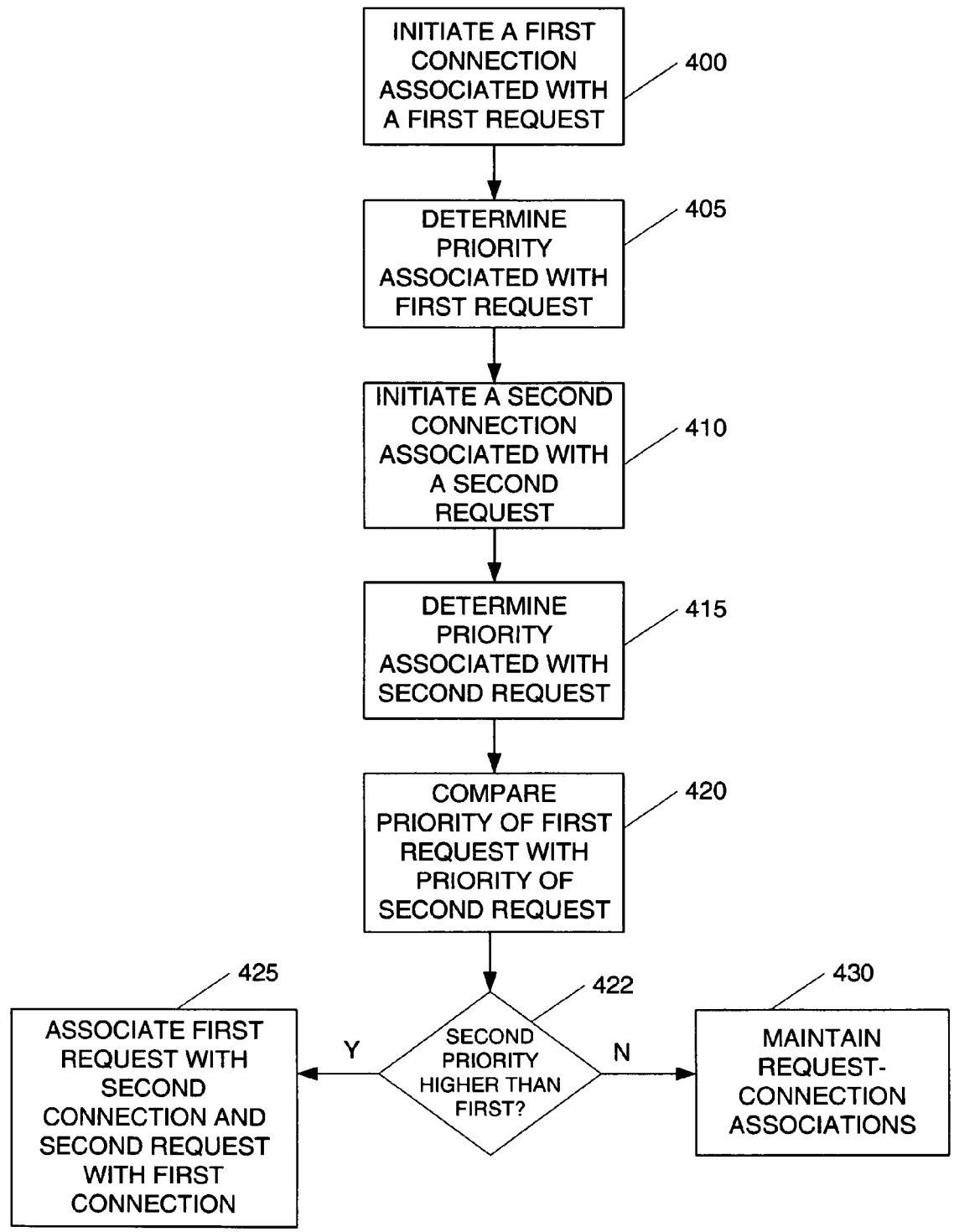
FIG. 4 is a flowchart showing a method for reprioritizing requests according to an illustrative embodiment.

FIG. 4 illustrates one method for reprioritizing calls in a call queue. In step 400, a VoiceXML gateway may receive instructions from a requesting party or web server to initiate a first connection with a receiving party associated with a first request. Thus, a VoiceXML gateway may establish a first connection and associate the connection with the first request. A queuing system of the receiving party may further assign the first connection a first queue position. In step 405, the requesting party or web server may further determine a priority associated with the first request and note such information in, for example, a request database. The priority associated with a call may be determined by the identity of the requesting party, the nature of the call or request and/or a specified time period within which the request must be addressed. Alternatively, the priority of the call may be manually defined or assigned by a requesting party via a GUI. In one example, a hospital may request power restoration from a power company after a blackout. In view of the importance of the calling party (i.e., the hospital), the web server may determine that the call is of high priority. Alternatively, the web server may determine or indicate the priority of the call prior to initiating the connection with the receiving party. Priority may further be denoted or represented by a numerical value based on a priority range (e.g., 1-10).

After the first connection associated with the first request has been established with the receiving party, the VoiceXML gateway may subsequently receive a second request in step 410. In response, the VoiceXML gateway may establish a second connection with the receiving party and associate the second connection with the second request. As with the first connection, the queuing system of the receiving party may assign the second connection a second queue position. After establishing the second connection, the priority of the second request may be determined and evaluated in step 415 using methods similar to those used in handling the first call. In steps 420 & 422, the priorities of the first and second requests are compared to determine which of the two requests has higher priority. In one alternative embodiment, the comparison of the priorities may be based on priority levels pre-assigned by a requesting party. Additionally, the determination regarding request priority may be made through a manual comparison by the requesting party. If the priority of the second request is higher than the priority of the first request, the connection associations are modified in step 425. The VoiceXML gateway would re-associate the first connection with the second request and associate the second connection with the first request. In one example, a VoiceXML gateway would play the request information of the second request through the first connection, instead of the information associated with the first request. However, in step 430, if the priority of the first request is higher than the priority of the second request, the connection associations would be maintained.

In an alternative embodiment, the priority of a received call may be compared to the priority of each of the previously received calls existing in the queue to determine proper placement of the received call. The queuing system may also conduct comparisons between the received call and each previously queued call in sequence until a previously queued call is found that has a higher priority than the received call. The method of sorting priority and queued calls may be modified based on many factors including compatibility with a predefined queuing scheme or hierarchy.

The methods and systems for eliminating hold time may further be integrated into a service ticket management system. Service ticketing systems allow a requesting party to generate an electronic service ticket relating to a problem or request in the requesting party's system. The electronic service ticket is then transmitted to the receiving party's system, where a corresponding ticket is automatically generated. Furthermore, changes to the tickets on either system may automatically update the corresponding ticket on the other. Thus, instead of conducting live communications, a receiving party may handle service requests by communicating through the tickets. Such systems may be more efficient for requesting and receiving parties that are in frequent contact with one another.

Figure 5:
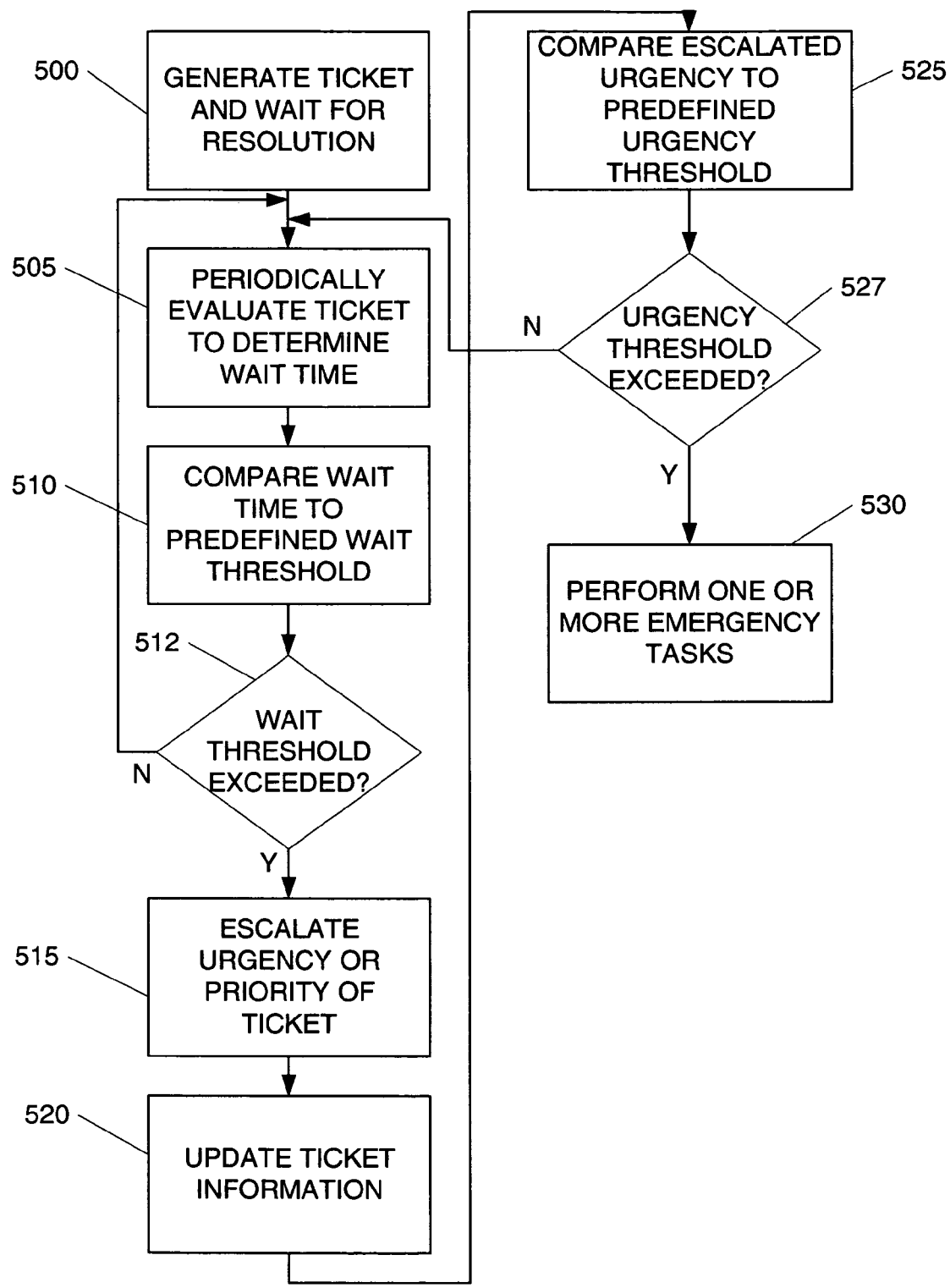
FIG. 5 is a flowchart showing a method for managing and escalating the urgency of a ticket according to an illustrative embodiment.

In some instances, however, a service ticket may go unaddressed for a significant period of time. In such cases, a parameter that indicates a level of urgency or priority may be associated with the ticket to provide a receiving party an additional variable to consider when selecting a service ticket to handle or address. In the event that a service ticket goes unaddressed for several hours, the requesting party may escalate the level of urgency of that ticket, which may, in turn, trigger one or more actions. FIG. 5 illustrates a method for managing and escalating the urgency of a ticket. In step 500, a ticket is generated on both the receiving and requesting parties' systems and waits for resolution. A service ticket on the receiving party's systems may be placed into a queue similar to those for fielding telephone calls. Alternatively, the service ticket may be placed into a database and stored according to variables such as requesting party ID and category of request.

Periodically, in step 505, the service ticket may be evaluated, either on the receiving party's system or the requesting party's system, to determine, for example, how long the ticket has gone unaddressed. The service ticket's wait time may then be compared to a predefined threshold to determine whether the threshold has been exceeded in steps 510 & 512. In response to a determination that the threshold has been exceeded, the urgency or priority parameter of the ticket may be escalated in step 515. FIG. 5 uses the length of wait time as an escalation parameter by way of example and this should not be read to restrict or limit the methods by which the level of urgency or priority may be escalated. One of skill in the art will appreciate that a variety of factors and variables may be considered in lieu of or in combination with wait time in determining urgency escalation.

If the ticket is escalated in step 515, the ticket information is then updated for both the requesting party and the receiving party in step 520. For example, if ticket escalation is performed by the requesting party's system, the new urgency level and updated ticket information will be transmitted to the receiving party, or the systems thereof. The same would occur if the ticket is escalated by the receiving party (i.e., updated information is transmitted to the requesting party's system). Following ticket escalation, in step 525 & 527, the escalated urgency of the service ticket is further compared to a predetermined urgency threshold to determine whether a predefined action should be taken. In on example, a receiving party may provide a requesting party with an emergency telephone number for exceedingly urgent situations. If a service ticket rises above a predetermined urgency threshold, a call may be automatically placed to the emergency number in step 530 using the methods and systems described herein. Other actions that may be invoked include generating and sending an e-mail, forwarding the ticket to an emergency response team and the like. Steps 520 and 525 may be performed in interchangeable order and are not limited to the order shown in FIG. 5.

Figure 6A:
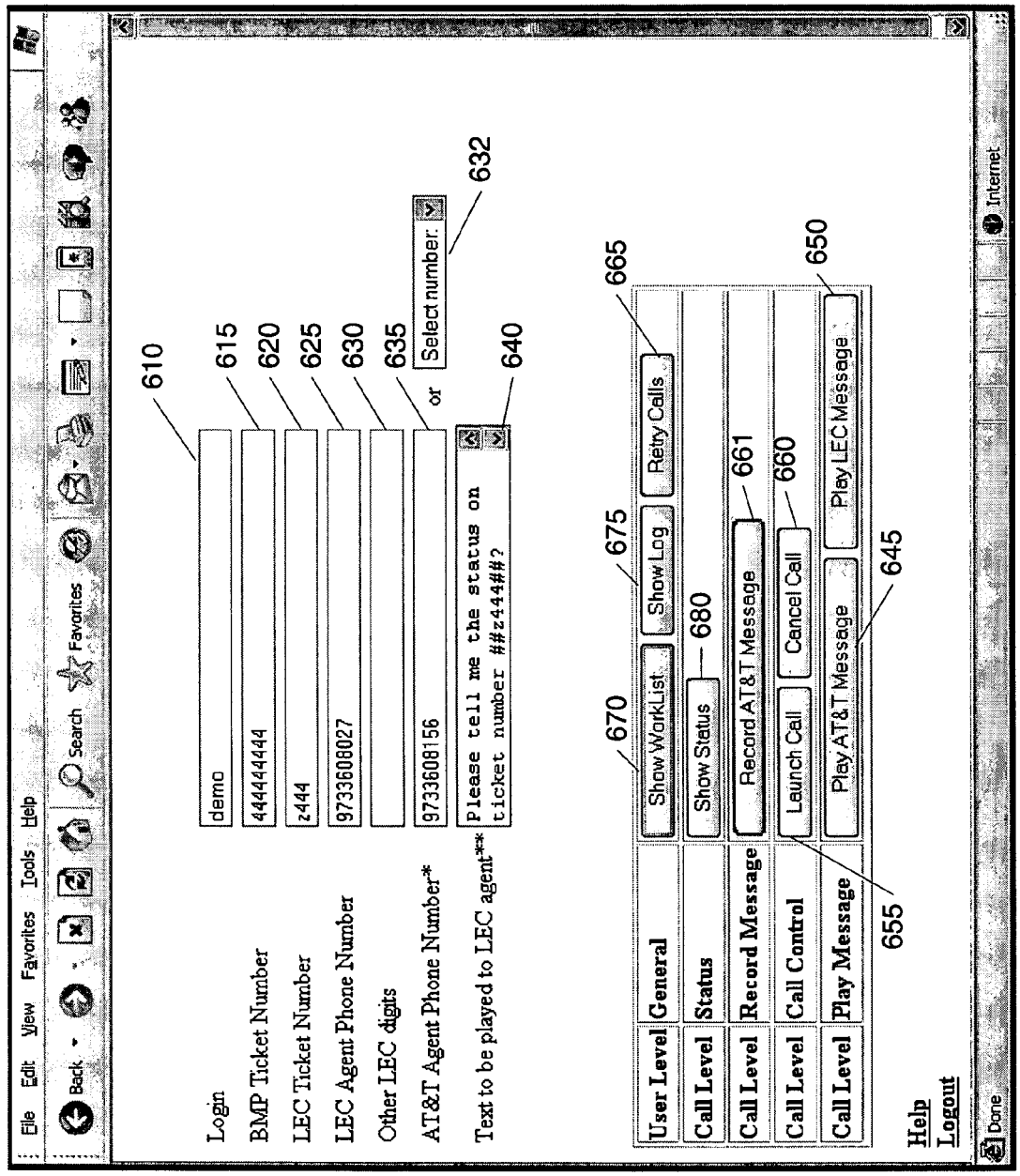
FIG. 6A is a graphical user interface diagram for initiating a service or information request call according to an illustrative embodiment.

FIG. 6A shows a graphical user interface diagram for initiating a service or information request call. The user interface of FIG. 6A is directed toward phone service company interaction and provides several data entry fields for request related information. For example, the data entry fields include login 610, requesting party ticket number 615, receiving party ticket number 620, receiving agent phone number 625, other receiving party digits 630, requesting party phone number 635 and text to be played 640. The login field 610 permits a requesting party, such as an agent of a long distance provider, to identify themselves by a login identifier. To provide further verification and security, the user interface for the login page may further prompt the agent for a password associated with the login ID (not shown). Once the user has entered their login identification, one or more of the other fields may be automatically filled according to data associated with the user's profile. For example, an agent may login using their ID, "demo." Upon logging in, the agent's phone number field may be automatically filled using information stored in the agent's login profile. Other information that may be automatically provided by the login profile information includes an instant messaging handle, e-mail address, cell number and the like.

The ticket number fields 615 & 620 relate to the ticket reference numbers for the requesting party's ticket 615 and the receiving party's (e.g., LEC's) corresponding ticket 620. Providing such information would associate the call with a particular service ticket and may allow a receiving party agent to locate additional information about the service request from the indicated ticket. Additionally, in order to launch or initiate a call to the receiving party, the user generally enters a telephone number in the receiving party phone number field 625. If the user is also aware of one or more digits that must be entered to navigate a telephone menu, such a sequence may be entered in the other receiving party digits field 630. The other digits field 630 is intended to eliminate the need for any human interaction with the receiving party's communication system. The requesting party may further implement a database of contact information (e.g., speed dial list). A user may access the database to lookup a phone number or navigation digits using a web dialog page (not shown) or a pull-down selection menu 632 populated by the database. The database may include phone numbers, instant messaging handles, e-mail addresses and the like. Additionally, upon selecting a phone number or address from the database, one or more other fields of a web entry form may be automatically filled according to pre-stored information in the database.

The user interface may further provide user level and call level features. The user level features include the show worklist option 670, the show log option 675, and the retry calls option 665. The user level features give the user access to information about previous or existing calls and are described in further detail with respect to FIGS. 7A, 7B & 7C. The call level features, on the other hand, relate to setting up, launching, and monitoring the next call. The user interface may provide call level features such as the show status option 680, the record requesting party message option 661, the launch call option 655, the cancel call option 660, the play requesting party message option 645, and the play receiving party message option 650.

For example, the launch call option 655 instructs the VoiceXML gateway to initiate the call to the receiving party using the provided information as discussed with respect to FIG. 2. Once a connection has been established using the information provided in fields 625 & 630, the calling system (e.g., VoiceXML gateway) may play text entered in the text field 640 using, for example, the text-to-speech capability. A user may also provide audio to be played to the receiving party using the record message option 640. The record message option 661 permits a requesting party to record an audio message for the receiving party instead of or in addition to the text entered in the text entry field 635. The recorded audio may also be stored into a data filed by the web server or VoiceXML gateway and transmitted using a variety of methods, including instant messaging and e-mail. The recorded audio file may further be associated with the specified ticket number to facilitate identification of the recorded audio message. If the user or agent would like to verify or hear the message that was recorded for the receiving party, he or she may select the play requesting party message option 645. Additionally, if the receiving party has responded with a recorded message, that message may also be played using the play receiving party message option 650.

On the other hand, if the agent or user wishes to cancel the call, he or she may select the cancel call option 660 which might not only disconnect the call, but also insure that the call and/or ticket is removed from the receiving party's call or ticket queue. In the event that a call has been disconnected and is unresolved, the requesting party may use the retry calls option 665 to re-initiate the call to the receiving party using the information previously entered by the user. Alternatively, the user may enable an automatic retry option that would execute the retry logic described previously in combination with or instead of the manual retry option.

Figure 6B:
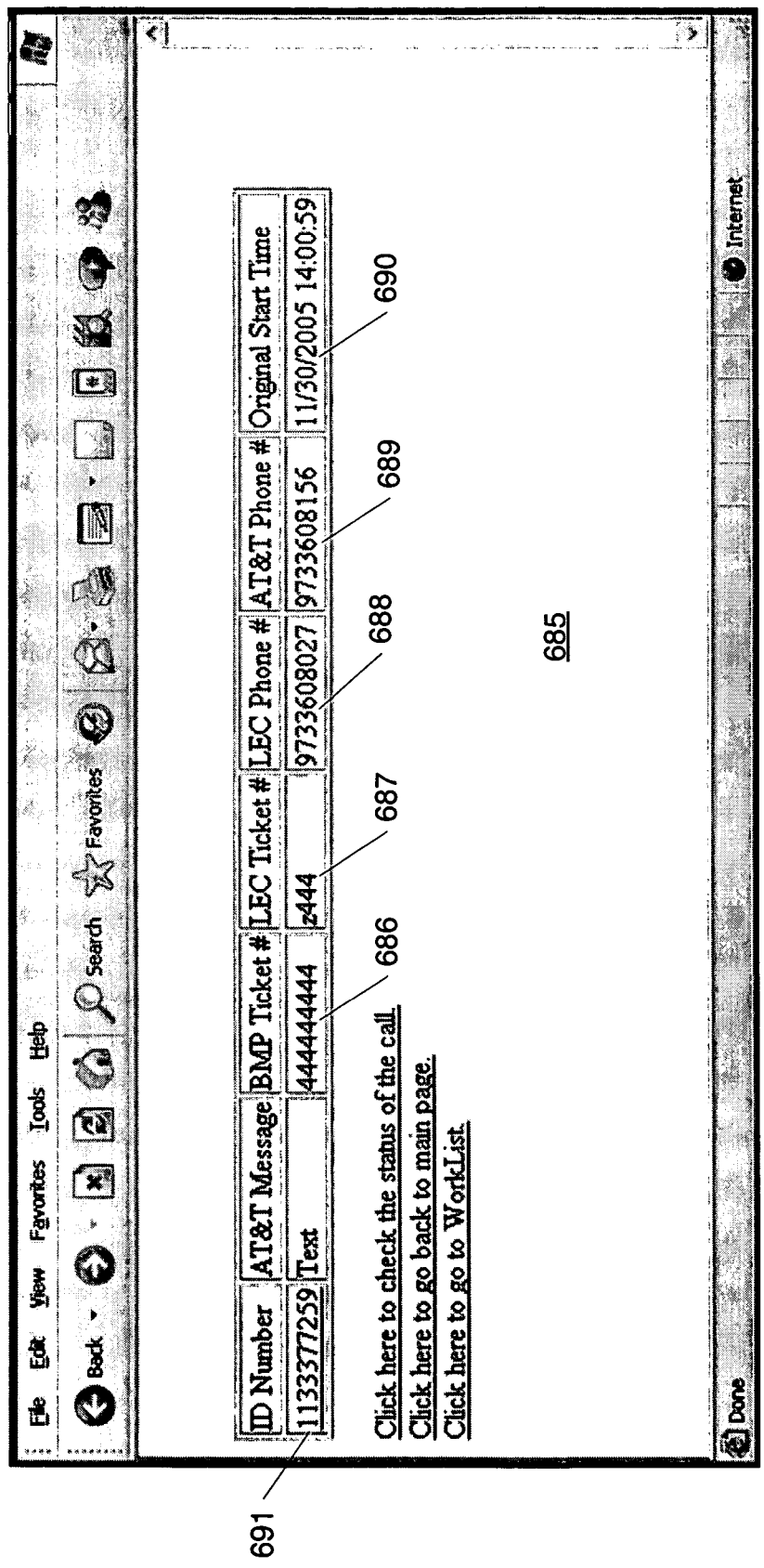
FIG. 6B is a graphical user interface diagram showing a web dialog for retrying calls or requests.

FIG. 6B illustrates a graphical user interface for retrying calls or requests. The retry calls page 685 provides a list of calls or requests that can be retried along with a variety of data relevant to the call or request including the ticket numbers 686 & 687, receiving party phone number 688, requesting party phone number 689 and the original start time of the request 690. In order to retry a particular call, the user or requesting party may click on the ID number 691 of the particular call. The retry dialog may also allow a user to retry multiple calls at the same time by indicating all the calls to retry. For example, the retry dialog 685 may provide selection boxes next to each of the requests or calls in the retry list. The user may then toggle the selection boxes of each call to be retried and initiate all of the selected calls simultaneously.

Figure 7A:
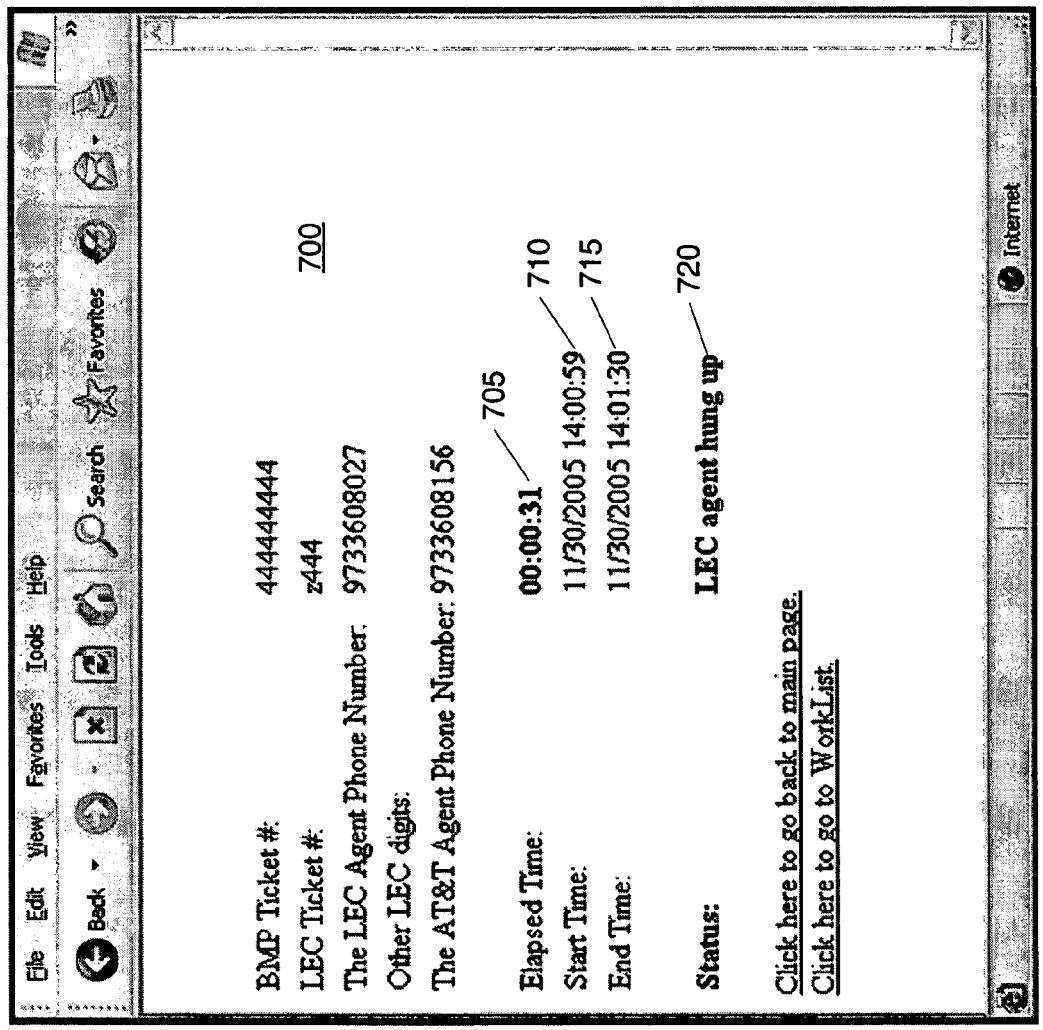

As discussed previously, a requesting party may access additional information about outstanding requests as well as previous requests using information options 670, 675 & 680 of FIG. 6A. FIG. 7A is a call status page 700 corresponding to a current outstanding call or request. In addition to the call information entered by the requesting party upon call initiation, the status page 700 may also indicate the elapsed time (i.e., since the call was placed) 705, the time the call was initiated or received 710, if and when the call has ended 715 and a status message 720. The status message 720 may be provided by the VoiceXML gateway to reflect a current call status (e.g., in queue, disconnected, paused) or, alternatively, may be entered by the receiving party to indicate the status of the request (e.g., processing, queued, transferred, complete). Other status data may also be displayed on the status page 700, including the estimated hold time and the assigned priority of the request or call. The call status page 700 may be automatically refreshed according to a predefined refresh rate or may be manually refreshed.

FIG. 7B is a graphical user interface displaying a worklist of a requesting party or agent. The worklist page 725 shows a comprehensive table of calls initiated by the login "demo" and the calls' corresponding status information. In addition to the ticket number information 726 & 727, the table also includes indicators 728 & 729 of the type (i.e., audio and/or text) of messages transmitted from the requesting party and received from the receiving party. In some embodiments, a user may access the audio or text message by clicking on the type indicator 728 & 729. In FIG. 7B, for example, the type indicator is an HTML link that permits a user to click on the text to retrieve the corresponding audio or text message.

The worklist table 725 may further include a progress field 730 that indicates the progress of the call. The progress indicator 730 is a reflection of the status, whether active or inactive, of the request or call. Thus, if a call or request has been completed, the progress indicator 730 would indicate that the call is inactive. On the other hand, if the call is still in the receiving party's hold queue, the progress field 730 would indicate that the call is currently active. The status field 731 provides information that elaborates on the status of the call, beyond whether the call is active or inactive. For example, the status field 731 may indicate that the receiving party has fielded the call and is currently connected to the requesting party. The worklist table 725 may be automatically refreshed according to a predefined refresh rate or may be manually refreshed using a refresh option 735.

To obtain even more detailed information regarding an individual or multiple calls, a user may access the call log page 740 illustrated in FIG. 7C. The call log page 740 logs and displays call activity, status changes and the corresponding times. Thus, if a user wanted to check when a call was fielded by a receiving party, he or she may view the call log page 740 to locate that information. In FIG. 7C, LEC ticket #z444 is shown having two call activity entries 745 & 750. In the initial entry 745, the status field indicates that the receiving party answered the call after an elapsed time of 7 seconds (according to the elapsed time field 756). Entry 750 indicates that the receiving party subsequently hung up the call after an elapsed time of 22 seconds. Each entry 745 & 750 also provides the start time of the call or activity in the start time field 755. Additionally, the retry field 760 indicates whether the call or request was retried. One of skill in the art will appreciate that a variety of call activity may be logged and is not limited those shown in the illustration of FIG. 7C.

Figure 8:
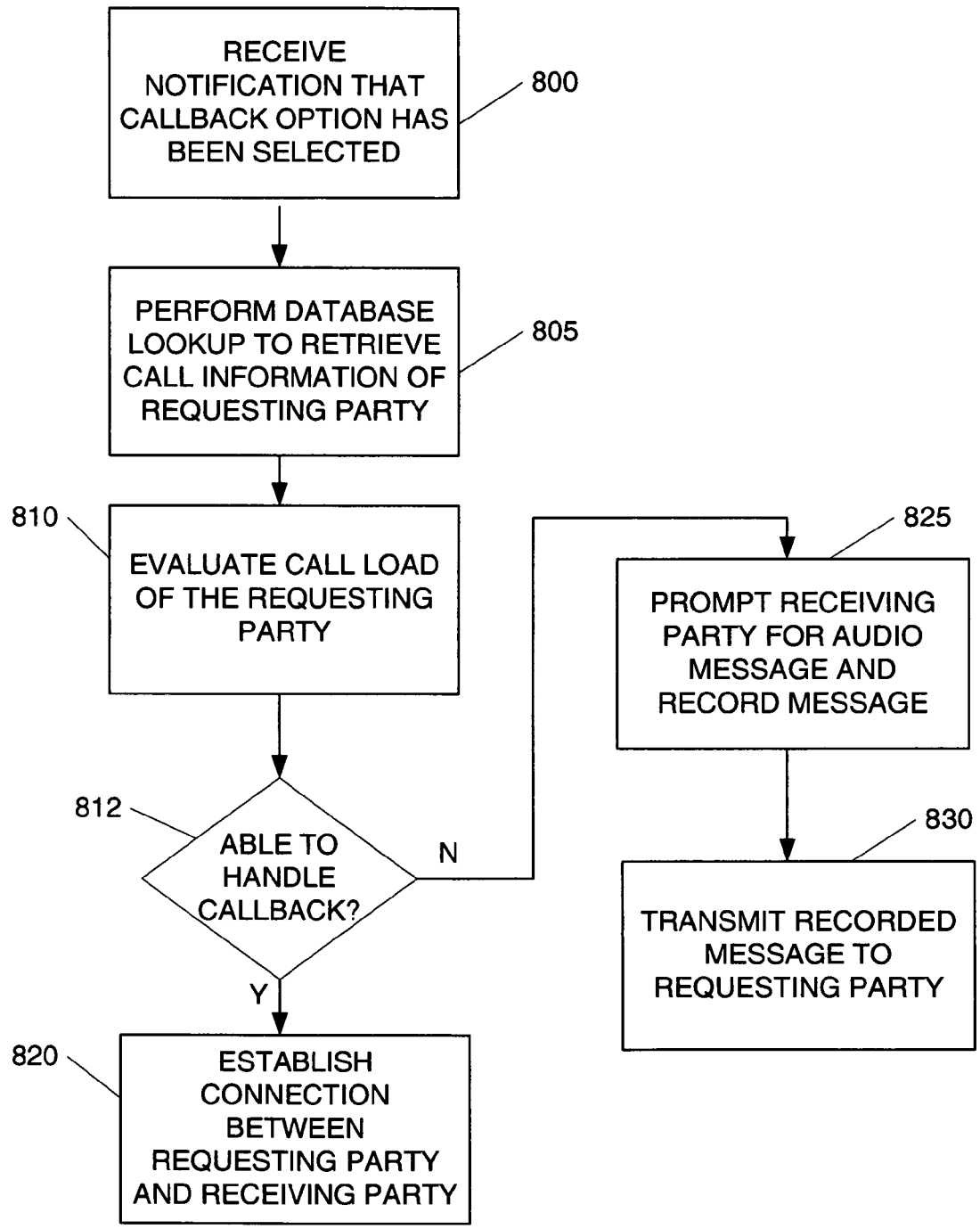
FIG. 8 is a flowchart showing a method for detecting and managing the call load of a requesting party according to an illustrative embodiment.

In various situations, a receiving party may select the option to call back the requesting party. However, the requesting party may already be fielding one or more calls regarding other calls or requests. As such, the receiving party would receive a busy signal or be placed in the requesting party's queue. To avoid such situations, a flowchart showing a method for detecting and managing the call load of a requesting party is shown in FIG. 8.

In step 800, a VoiceXML gateway informs the web server that the receiving party (e.g., LEC agent) has selected the callback option and requests the call load status of the requesting party. In step 805, the web server will perform a database lookup to retrieve current call information of the requesting party. The web server then makes a determination as to whether the requesting party is able to handle another call given the requesting party's communication resources in steps 810 & 812. For example, the web server may analyze the current call information to check if the requesting party is currently on the phone with another receiving party. If the web server determines that the requesting party is able to handle the incoming callback from the receiving party, the web server will inform the VoiceXML gateway of such. In response to a determination that the requesting party is able to handle the call, the VoiceXML gateway will establish the connection with the requesting party in step 820 via methods and systems similar to those described in FIG. 2. If, however, the web server determines that the requesting party is currently unable to attend to the incoming callback, the VoiceXML gateway may perform a backup option, such as prompting the receiving party to record an audio message in step 825 rather than establish the callback connection as requested. The VoiceXML gateway, prior to prompting and recording the audio message, may transmit a pre-recorded message informing the receiving party that the requesting party is currently unavailable. The VoiceXML gateway, upon recording the audio message, may then transmit the recorded message by e-mail and/or via other methods known in the art in step 830. In either situation (i.e., callback or no callback), the VoiceXML gateway may additionally inform the web server of the call activity (e.g., recording or callback) so that the call database may be updated.

In one or more alternative embodiments, the VoiceXML gateway may initially establish a connection with the requesting party in response to a callback request rather than request a call load determination from the web server. In such a case, the VoiceXML gateway may evaluate the response at the requesting party's end to determine a call state. For example, the VoiceXML gateway may comprise tone frequency and pattern detection components that are able to identify a busy signal or fax communication signals. Other call states may include no answer and call failure. In any of these instances, the VoiceXML gateway may, as described in FIG. 8, prompt the receiving party to record a message for the requesting party or, alternatively, transfer the call to a voicemail phone number corresponding to the requesting party.

The secondary options may be selected by either the requesting party or the receiving party or may be preset by a system default of the VoiceXML gateway. Other secondary options that may be used in place of or in combination with recording an audio message include opening an instant messaging session, sending an e-mail or transferring the callback to a secondary agent.

Aspects of the invention may further be implemented using computer readable instructions stored on a computer readable medium. Such instructions may be implemented in a variety of computing devices including a web server or VoiceXML gateway or other components described herein to manage calls in a hold queue and facilitate responses from a receiving party.

Additionally, many of the methods and systems of the invention have been described specifically with respect to a VoiceXML gateway and a web server. However, the functions described herein may be performed in either system and through a multitude of other communication architectures and data devices. For example, the methods and systems described may be implemented using a Session-Initiation Protocol (SIP) architecture. The SIP Architecture may contain several components such as a PSTN (Public Switched Telephone Network) gateway, a SIP Application Server that supports HTTP and SIP messaging, a Web server for the GUI and for handling HTTP requests from the VoiceXML Gateway, and a VoiceXML gateway for handling the IVR dialog. The HTTP interface to the SIP Application Server may invoke a SIP message to the PSTN gateway to call the receiving party (e.g., clicking on a link or button would issue or generate this HTTP request). The PSTN gateway may also send back a SIP message to the SIP Application Server to inform the VoiceXML gateway (also via SIP messaging) to play prompts and receive input from the requesting party. Thus, the SIP Application Server may effectively run a servlet and instruct the PSTN gateway to make the calls. The VoiceXML gateway is added to provide the dialog interaction. The VoiceXML gateway in the SIP architecture may further interact via HTTP with a Web server much like the VoiceXML gateway interacts with the Web server in the pure VoiceXML gateway implementation.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method for processing communications between a requesting party and a receiving party, comprising:
   establishing, at a server comprising a first system, and in response to receiving input comprising a plurality of communication data from a requesting party through a first network connection, a second network connection between the server and a destination device associated with the receiving party; and
   transmitting the plurality of communication data from the server to the destination device,
   wherein a second system monitors the second network connection and detects input from the receiving party and, in response to detecting the input from the receiving party, evaluates the detected input to determine a task corresponding to the detected input, and performs the determined task, wherein each of a plurality of possible inputs are associated with a respective task, and
   wherein the determined task comprises receiving audio input from the receiving party, establishing a third network connection between the server and the requesting party, and transmitting data associated with the audio input to the requesting party through the third network connection in an email message.

2. The method of claim 1,
   wherein the second system detects a termination of the second network connection between the server and the destination device, determines whether a response to the communication data was received from the receiving party, and re-establishes the second network connection after a wait time when a response was not received.

3. The method of claim 1,
   wherein the server comprises a web server and the second system comprises a voice gateway.

4. The method of claim 1,
   wherein the first system and the second system are implemented on the server.

5. The method of claim 1,
   wherein the input from the requesting party is received via a graphical user interface.

6. A method for processing communications between a requesting party and a receiving party, comprising:
   establishing, at a server comprising a first system, and in response to receiving input comprising a plurality of communication data from a requesting party through a first network connection, a second network connection between the server and a destination device associated with the receiving party; and
   transmitting the plurality of communication data from the server to the destination device,
   wherein a second system monitors the second network connection and detects input from the receiving party and, in response to detecting the input from the receiving party, evaluates the detected input to determine a task corresponding to the detected input, and performs the determined task, wherein each of a plurality of possible inputs are associated with a respective task, and wherein the determined task comprises determining, from input, a pause time comprising a requested longer period of time than a default period of time for input.

7. A method for processing communications between a requesting party and a receiving party, comprising:
- establishing, at a server comprising a first system, and in response to receiving input comprising a plurality of communication data from a requesting party through a first network connection, a second network connection between the server and a destination device associated with the receiving party; and
- transmitting the plurality of communication data from the server to the destination device,
- wherein a second system monitors the second network connection and detects input from the receiving party and, in response to detecting the input from the receiving party, evaluates the detected input to determine a task corresponding to the detected input, and performs the determined task, wherein each of a plurality of possible inputs are associated with a respective task, and
- wherein the determined task comprises establishing a third connection with the requesting party and transmitting a predefined message to the requesting party.

* * * * *